United States Patent
Ebsen et al.

(10) Patent No.: US 10,739,996 B1
(45) Date of Patent: Aug. 11, 2020

(54) ENHANCED GARBAGE COLLECTION

(71) Applicant: Seagate Technology LLC, Cupertino, CA (US)

(72) Inventors: David Scott Ebsen, Minnetonka, MN (US); Kevin A Gomez, Eden Prairie, MN (US); Mark Ish, Castro Valley, CA (US); Daniel John Benjamin, Savage, MN (US); Robert Wayne Moss, Windsor, CO (US)

(73) Assignee: Seagate Technology LLC, Fremont, CA (US)

( * ) Notice: Subject to any disclaimer, the term of this patent is extended or adjusted under 35 U.S.C. 154(b) by 962 days.

(21) Appl. No.: 15/213,298

(22) Filed: Jul. 18, 2016

(51) Int. Cl.
| | | |
|---|---|---|
| *G06F 16/00* | (2019.01) | |
| *G06F 3/06* | (2006.01) | |
| *G06F 16/17* | (2019.01) | |
| *G06F 16/11* | (2019.01) | |
| *G06F 16/2455* | (2019.01) | |

(52) U.S. Cl.
CPC ............ *G06F 3/0608* (2013.01); *G06F 3/064* (2013.01); *G06F 3/065* (2013.01); *G06F 3/0652* (2013.01); *G06F 3/0659* (2013.01); *G06F 3/0673* (2013.01); *G06F 16/11* (2019.01); *G06F 16/1724* (2019.01); *G06F 16/1727* (2019.01); *G06F 16/24561* (2019.01)

(58) Field of Classification Search
CPC .. G06F 16/11; G06F 16/1724; G06F 16/1727; G06F 16/24561; G06F 12/0246; G06F 12/0253; G06F 12/0269; G06F 12/0276; G06F 11/108; G06F 3/0607; G06F 3/061; G06F 3/0638; G06F 3/0688; G06F 3/0608; G06F 3/0652; G06F 3/0659
See application file for complete search history.

(56) References Cited

U.S. PATENT DOCUMENTS

| | | | | |
|---|---|---|---|---|
| 5,204,965 | A | * 4/1993 | Guthery | ................. E21B 47/00 718/102 |
| 7,409,489 | B2 | 8/2008 | Sinclair | |
| 8,205,063 | B2 | 6/2012 | Sinclair | |
| 8,452,940 | B2 | 5/2013 | Sinclair | |
| 2008/0183953 | A1* | 7/2008 | Flynn | .................... G06F 3/0613 711/103 |
| 2009/0265508 | A1 | 10/2009 | Bennett | |
| 2011/0066808 | A1* | 3/2011 | Flynn | ................. G06F 12/0246 711/118 |
| 2012/0079175 | A1* | 3/2012 | Flynn | .................. G11C 7/1012 711/103 |

(Continued)

*Primary Examiner* — Dinku W Gebresenbet
(74) *Attorney, Agent, or Firm* — Setter Roche LLP; Christian W Best; Kirk A Cesari (57) ABSTRACT

Systems and methods are disclosed for enhanced garbage collection operations at a memory device. The enhanced garbage collection may include selecting data and blocks to garbage collect to improve device performance. Data may be copied and reorganized according to a data stream via which the data was received, or data and blocks may be evaluated for garbage collection based on other access efficiency metrics. Data may be selected for collection based on sequentiality of the data, host access patterns, or other factors. Processing of host commands may be throttled based on a determined amount of work to garbage collect a plurality of blocks, in order to limit variability in host command throughput over a time period.

20 Claims, 7 Drawing Sheets

(56) References Cited

U.S. PATENT DOCUMENTS

| | | |
|---|---|---|
| 2012/0110239 A1 | 5/2012 | Goss |
| 2013/0166818 A1 | 6/2013 | Sela |
| 2013/0339567 A1* | 12/2013 | Carpentier .......... G06F 11/0709 |
| | | 711/4 |
| 2016/0162203 A1* | 6/2016 | Grimsrud .............. G06F 3/0613 |

* cited by examiner

ENHANCED GARBAGE COLLECTION

SUMMARY

In certain embodiments, an apparatus may comprise a processor configured to receive a plurality of data streams, each data stream including write commands for sequential data from a single source, and write data according to the plurality of data streams to solid state memory as individual write commands are received. The processor may further perform a background process including determining associated data streams from the plurality of data streams for written data, and copying and rewriting the written data to be organized based on determined associated data streams of the written data.

In certain embodiments, an apparatus may comprise a processor configured to write data to blocks of a solid state memory, and perform a garbage collection operation to copy valid data from a selected block and erase the selected block. The garbage collection operation may include determining access efficiency metrics for data stored to the blocks, the access efficiency metrics indicating an amount of potential improvement of data access efficiency due to garbage collecting data from the blocks, and performing the garbage collection operation on one or more blocks selected based on the determined efficiency metrics.

In certain embodiments, an apparatus may comprise a processor configured to write data to blocks of a solid state memory, and perform a garbage collection operation to copy valid data from a selected block and erase the selected block. The garbage collection operation may include selecting a plurality of blocks on which to perform the garbage collection operation, determining a first amount of work required to perform the garbage collection operation on all of the plurality of blocks, and reducing a throughput of operations received from a host by a throttling amount that is based on the determined first amount of work, in order to limit variability in the throughput over a time period.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that, when executed, cause a processor to perform the methods.

Figure 1:
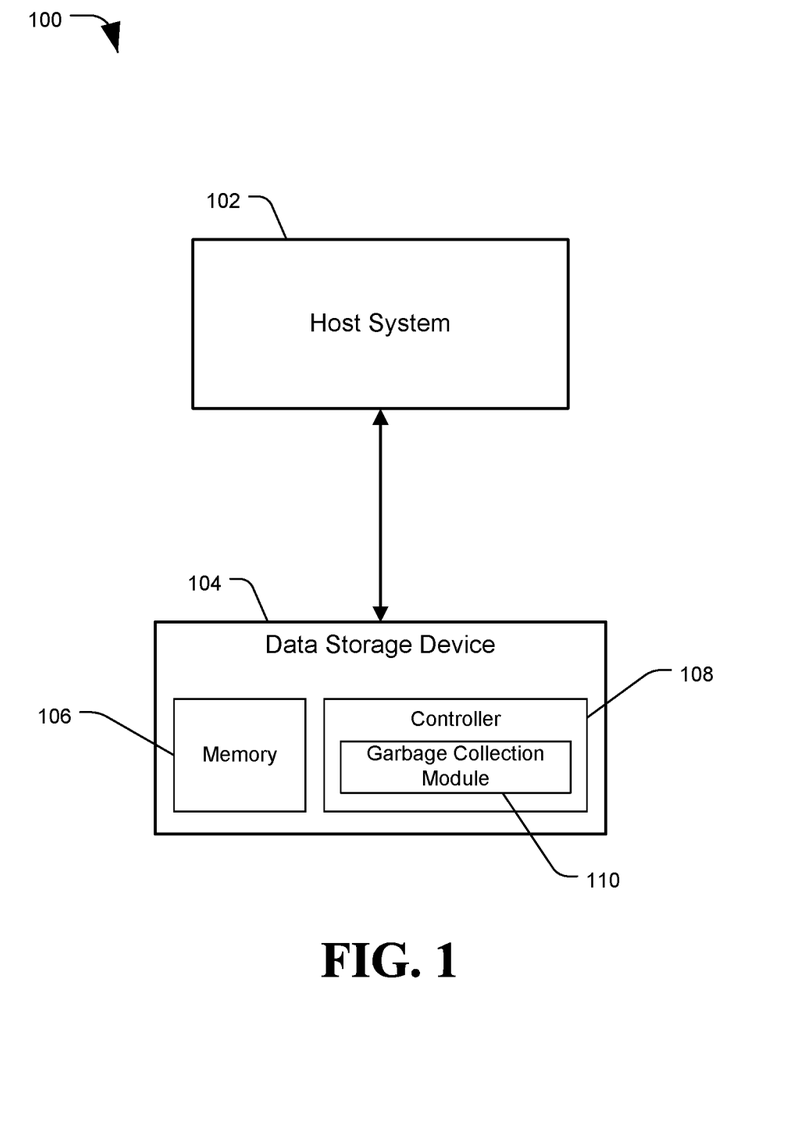
FIG. 1 is a diagram of a system configured to perform enhanced garbage collection, in accordance with certain embodiments of the present disclosure.

FIG. 1 is a diagram of a system configured to perform enhanced garbage collection, generally designated 100, in accordance with certain embodiments of the present disclosure. The system 100 may include a host 102 and a data storage device (DSD) 104. The host 102 may also be referred to as the host system, host device, or host computer. The host 102 can be a desktop computer, a laptop computer, a server, a tablet computer, a telephone, a music player device, another electronic device, or any combination thereof. Similarly, the DSD 104 may be any of the above-listed devices, or any other device which may be used to store or retrieve data, such as a solid state drive (SSD). The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal solid state hard drive).

The DSD 104 may include a memory 106 and a controller 108. The DSD 104 may receive a data access request, such as a read or write request, from the host device 102. In response, the DSD 104 may use the controller 108 to perform data access operations on the memory 106 based on the request. The controller 108 may comprise a circuit or processor configured to control operations of the data storage device 104, such as the methods and functions described herein, as well as storing data to or retrieving data from the memory 106. The memory 106 may comprise one or more data storage mediums, including nonvolatile solid state memories such as Flash memory, magnetic storage media such as disc drives, other types of memory, or a combination thereof.

Some memories 106, such as NAND Flash memory, may include a plurality of storage locations referred to as "blocks," and each block may include a plurality of smaller storage locations referred to as "pages." The pages may correspond to programmable word lines of the solid state memory array. Some solid state memories are not randomly writable in that data cannot be overwritten or updated in-place, and instead the storage locations must be erased or reset prior to being written with new data. Data may be written (or "programmed") at the page level, but the erasing process may be limited to the block level.

Due to the nature of how blocks are written and erased in solid state memory, data in a block may become invalid over time. Invalid data may be data which is no longer considered good or valuable, either because a more recent version of the data has been written elsewhere, or because the data is no longer needed (e.g. a host has issued a "trim" command to inform a solid state drive that data is no longer in use). For example, because data cannot be overwritten with updated versions of the data, updated data may be written to a different location with the old version becoming invalid. When too much of a storage drive's capacity is filled with invalid data, the drive may perform garbage collection operations to recapture blocks for storage. Garbage collection may include copying the valid data from one or more blocks, and then erasing or resetting those blocks so that they can be made available for storing additional data.

DSD 104 may include garbage collection module (GCM) 110. A module may be an element of a device that is configured to perform a particular task or job. A module may include one or more physical components of a computing device (e.g., circuits, processors, etc.), may include instructions that, when executed, can cause a processor to perform a particular task or job, or any combination thereof. The GCM 110 may perform the methods and processes described herein to select data and blocks for collection, and to determine how to organize and rewrite the valid data collected during garbage collection. A more detailed example embodiment of a DSD 104 is described in regards to FIG. 2.

Figure 2:
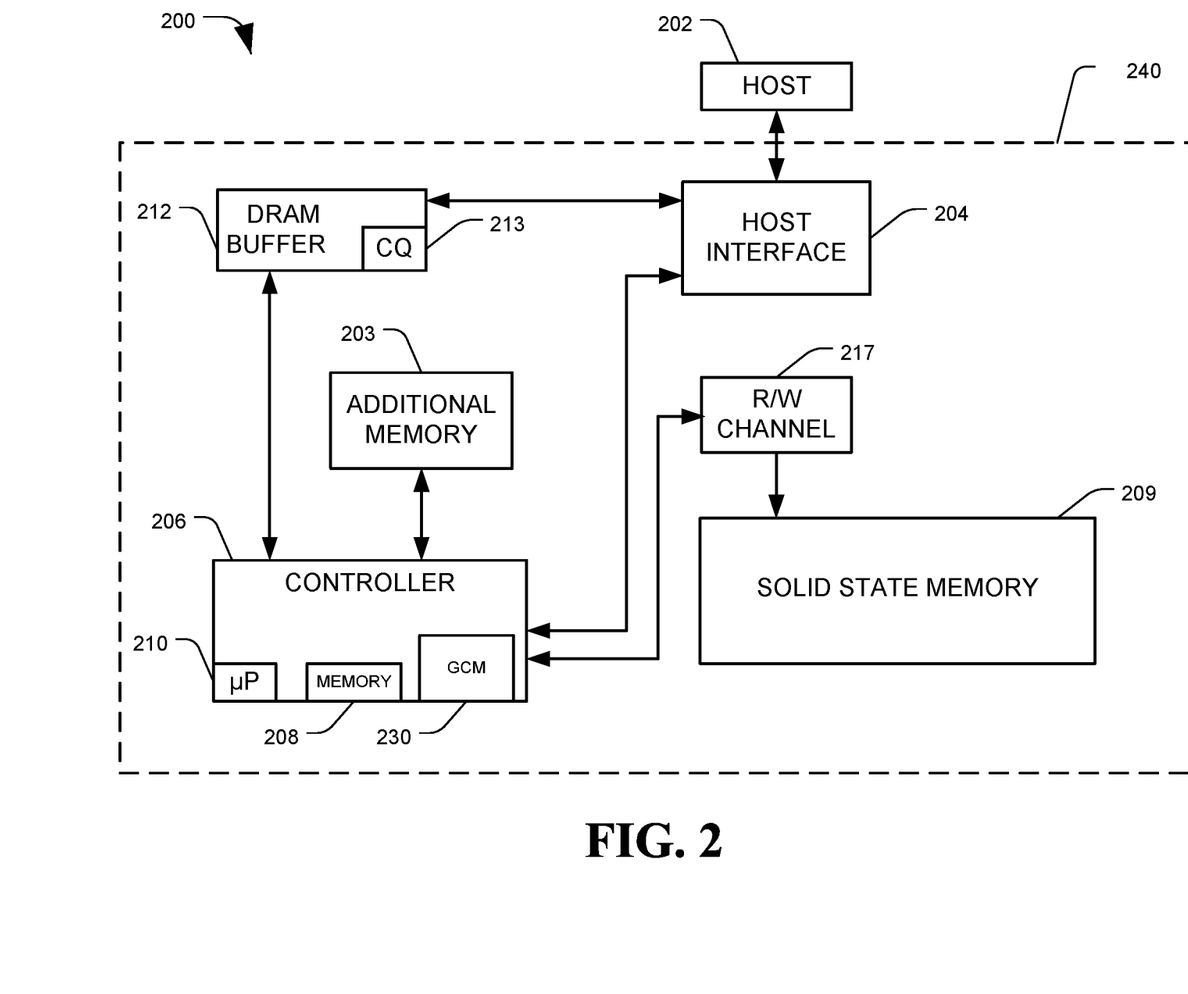
FIG. 2 is a diagram of a system configured to perform enhanced garbage collection, in accordance with certain embodiments of the present disclosure.

FIG. 2 is a diagram of a system 200 configured to perform enhanced garbage collection, in accordance with certain embodiments of the present disclosure. Specifically, FIG. 2 provides a functional block diagram of an example data storage device (DSD) 200. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. In some embodiments, the DSD 200 may have a casing 240 or housing containing the components of the DSD 200, or the components of the DSD 200 may be attached to the housing, or a combination thereof. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. In some embodiments, the DSD 200 can include a read-write (R/W) channel 217, which can encode data during write operations and reconstruct user data retrieved from a memory, such as solid state memory 209, during read operations. Solid state memory 209 may include nonvolatile memory, such as NAND Flash memory.

In some embodiments, the DSD 200 may include an additional memory 203 instead of or in addition to solid state memory 209. For example, additional memory 203 can be either volatile memory such as DRAM or SRAM, non-volatile memory such as magnetic disc(s) or additional nonvolatile solid state memory, or any combination thereof. The additional memory 203 can function as a cache and store recently or frequently read or written data, or data likely to be read soon. Additional memory 203 may also function as main storage instead of or in addition to solid state memory 209. A DSD 200 containing multiple types of nonvolatile storage mediums, such as a disc and Flash, may be referred to as a hybrid storage device.

DSD 200 may include a garbage collection module (GCM) 230. The GCM 110 The GCM 110 may perform the methods and processes described herein to select data and blocks for collection, and to determine how to organize and rewrite the valid data collected during garbage collection. For example, the GCM 230 may analyze valid data stored to blocks, and evaluate various attributes of the valid data to determine which blocks to garbage collect. The GCM 230 may also determine whether and how to reorganize the collected data to improve data access efficiency. Additionally, the GCM 230 may determine whether and how much to throttle processing on host commands while the garbage collection operations are performed in order to limit variability in host command throughput. Additional details on the solid state memory 209 and GCM 230 are discussed in regard to FIG. 3.

Figure 3:
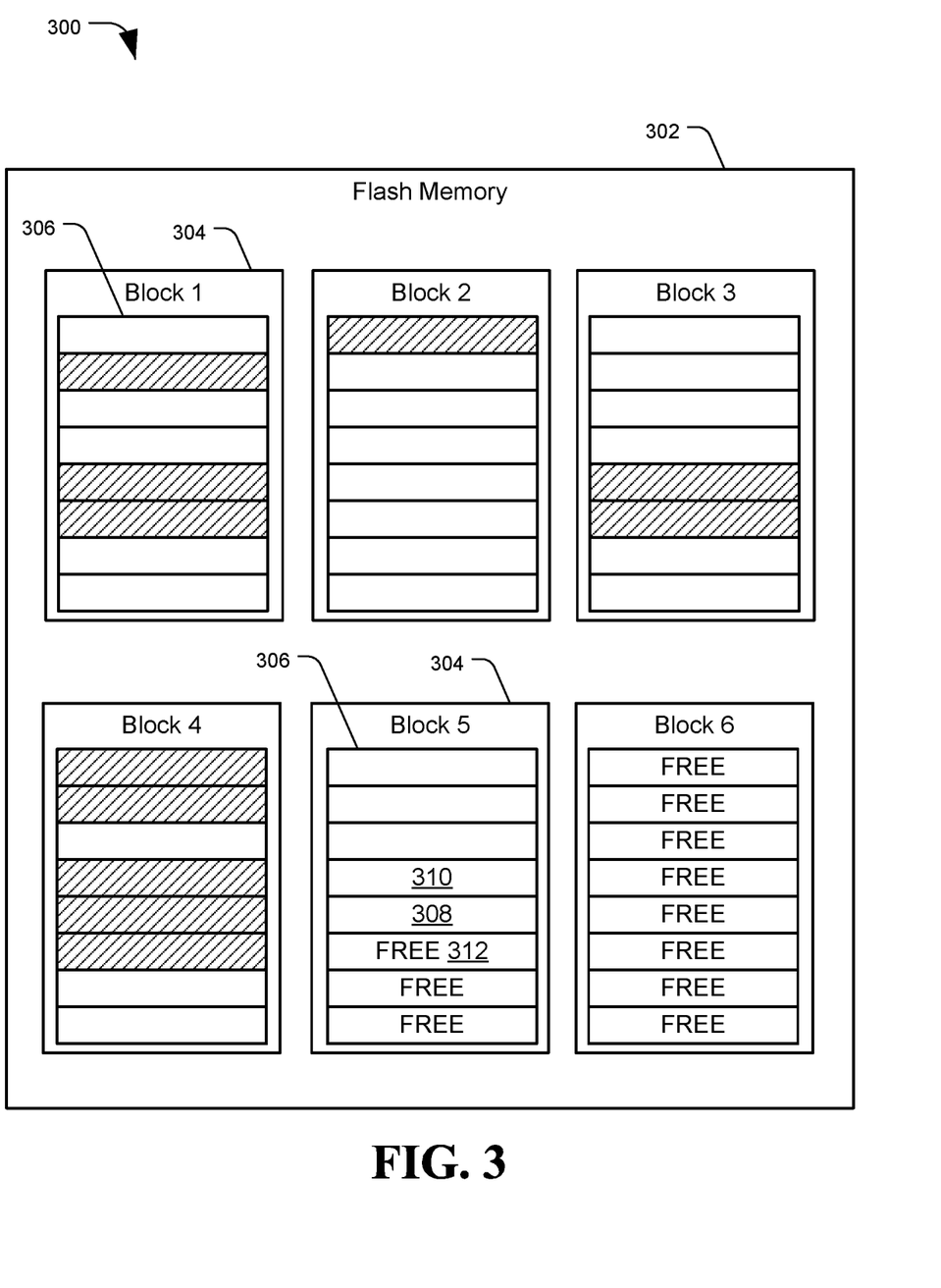
FIG. 3 is a diagram of a system configured to perform enhanced garbage collection, in accordance with certain embodiments of the present disclosure.

FIG. 3 is a diagram of a system 300 configured to perform enhanced garbage collection, in accordance with certain embodiments of the present disclosure. System 300 may include a NAND Flash memory 302, although other types of solid state memory are also possible. Flash memory 302 may include a plurality of blocks 304, each of which may include a plurality of writable pages 306 for storing data. Data may be written to Flash memory 302 in page-sized data segments. For example, each page 306 may store 8 KiB (kibibyte) of data, and a block 304 may contain 64 pages, or 128 pages. The size of pages and blocks, and the number of pages per block may be different depending on the device. A Flash memory may have a plurality of physical storage die, with each die including a plurality of blocks. Pages containing invalid data (e.g. no longer valid due to a more recent copy of the data being stored elsewhere) are indicated in FIG. 3 by hashed lines. Pages that have not yet been written are indicated as "free."

Data may be written to blocks 304 one page 306 at a time, but Flash memory may require that data be deleted in units of one or more entire blocks 304. Additionally, already written pages 306 may not be overwritten with new data, and can only be written again after the entire block 304 is erased. If data stored to a specific page 306 is updated (e.g. a newer version is written to a new location), the data for that page becomes invalid. In order to recapture storage space occupied by invalid data, a storage device may perform garbage collection operations on the Flash memory 302. In garbage collection, all valid data may be read from a block 304 for storage to a new location. Once all valid data has been removed from a block 304, the entire block 304 may be erased and made available for new data. The read valid data may be stored to a different block, or the data may be stored to a temporary memory location, such as a volatile cache, while the read block 304 is erased, allowing the valid data to be written back to the same block 304.

For example, Block 4 may be selected for garbage collection because it has the most invalid pages. The three valid pages may be read, and may be copied to the three free pages of Block 5. Block 4 may therefore no longer have any valid data, and all pages 306 in Block 4 may be erased and made free for new data.

As used herein, garbage collection may refer to reading and rewriting valid data. The block 304 from which the data was read may be erased to add the block 304 to a collection of free blocks available for storing data. Garbage collection may be used, as described above, to recapture storage space occupied by invalid data.

Additionally, garbage collection may be performed to reorganize valid data. For example, a data storage device (DSD) may perform reads and writes more efficiently if data remains organized sequentially according to logical addressing, such as by logical block addresses (LBAs) used by a host to access data. Sequential LBAs may frequently be accessed in close proximity, and proximate LBAs may be part of a single file or data structure. By locating sequential or proximate LBAs together on the physical storage media, the data can be accessed in fewer operations than if the LBAs were spread across multiple blocks or Flash die. However, as particular data segments are updated, requiring writing to a new location, the data can become fragmented. Similarly, if write or program operations from multiple data streams are received at a storage device, the data from those multiple streams may be stored together, producing effectively random data combinations. Hosts may also exhibit access patterns where non-sequential LBAs are frequently accessed together. Effectively sorting valid data can improve device responsiveness and efficiency, and reduce write amplification. Accordingly, a data storage device may employ garbage collection to sort and organize valid data according to a variety of factors, instead of or in addition to recapturing additional storage space from invalid pages 306. An example system of enhanced garbage collection is depicted in regards to FIG. 4.

Figure 4:
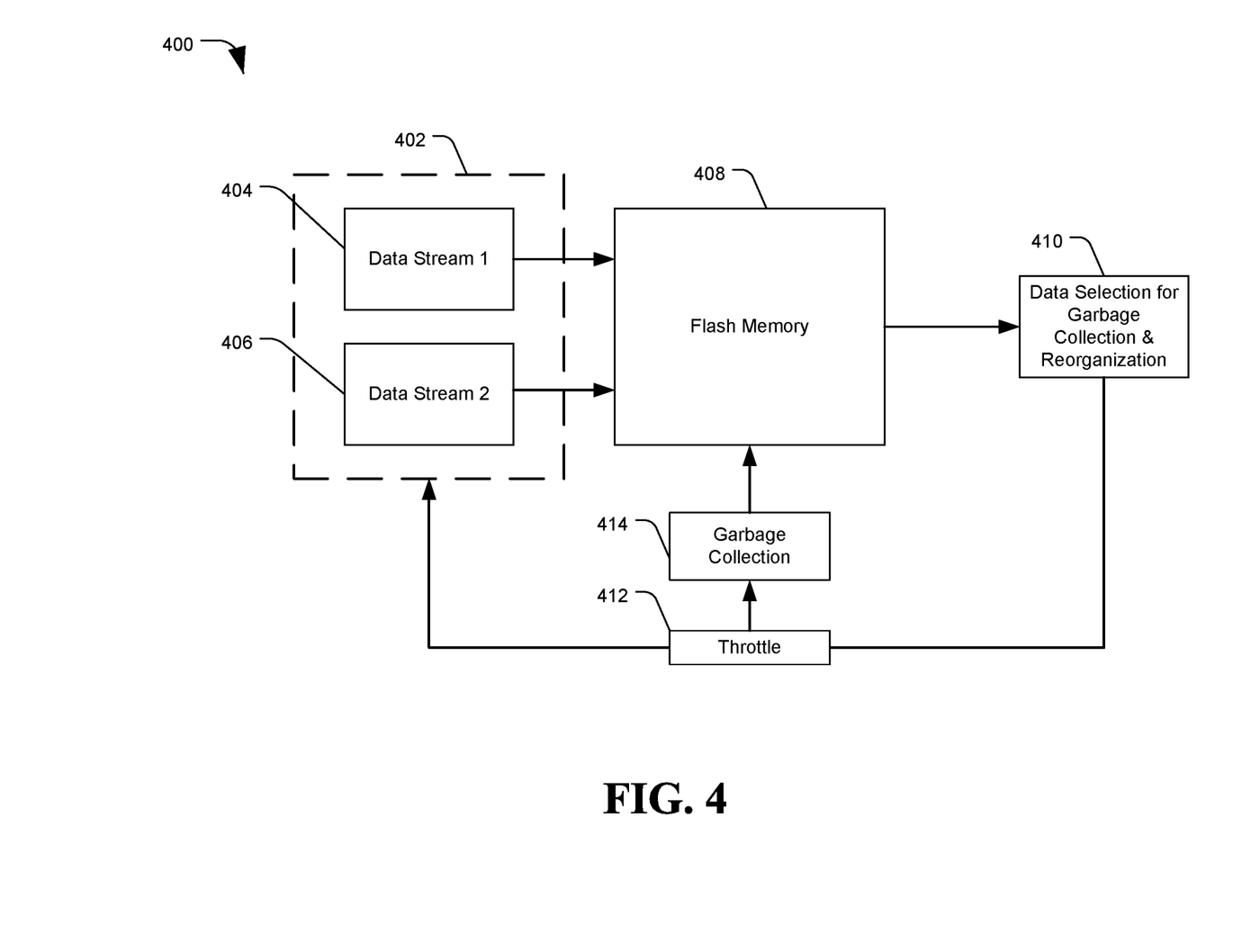
FIG. 4 is a diagram of a system configured to perform enhanced garbage collection, in accordance with certain embodiments of the present disclosure.

FIG. 4 is a diagram of a system 400 configured to perform enhanced garbage collection, in accordance with certain embodiments of the present disclosure. In particular, FIG. 4 may depict a process diagram of enhanced garbage collection operations performed at a data storage device such as the devices depicted in FIGS. 1 through 3.

A data storage device (DSD) may receive data access commands 402, such as program (write) commands and associated data to be written. The data access commands 402 may be received by the DSD via one or more data streams, such as data stream 1 404 and data stream 2 406. A data stream may include a sequence of data access commands (e.g. write commands) for data from a single source. A source may identify an origin of access commands. For example, a source may be an individual host device or user profile, and multiple devices or users may be accessing or connected to the DSD simultaneously. A source may include a port, such as a serial attached SCSI (SAS) port over which commands may be received. A source may also include a distinct processing thread, command queue, or other command source from a single host device, or any combination thereof. For example, three hosts may be connected to a DSD, with two of the hosts producing a single data stream each, and the third host producing four data streams via four distinct command queues at the third host.

A data stream may be for sequential data, or near-sequential data, or otherwise grouped together. For example, a data stream may be for a sequence of sequential LBAs without an LBA gap, or with relatively small LBA gaps. For example, a stream may be considered sequential so long as the LBA range of an incoming request is within X LBAs of the previous request. The data may also be considered sequential when the LBA difference between subsequent requests have a progressive increase or a progressive decrease (e.g. sequential requests for data correspond to increasing LBA ranges or decreasing LBA ranges). A data stream could also be grouped by, e.g., the SAS port it came in on, and hence the LBAs could be non-sequential but grouped such that they will be overwritten together as if sequential.

The DSD may access a Flash memory 408, or another non-volatile solid state memory, to service the data access commands 402, such as by storing data in response to write commands. Data may be stored to free pages of open blocks of the Flash memory 408. Over time, the Flash memory 408 may fill up with valid and invalid data. The stored data may be disorganized, for example due to data updates invalidating some pages, and from data associated with multiple data streams being received and stored together. The DSD may therefor perform data selection for garbage collection and reorganization operations 410, for example via a garbage collection module. The data selection for operations 410 may be initiated in response to various triggers, such as falling below a threshold amount of free blocks, during an idle period when host commands are not being processed, after a selected number of write operations or a selected quantity of data has been stored since a previous invocation of garbage collection or reorganization, or other trigger events.

Data selection for garbage collection and reorganization 410 may include selecting valid data to copy and store to a new location. Valid data may be selected based on how much invalid data is stored in the same block (how "stale" the block is). In another example, data received from different data streams may be mixed together based on the order individual write commands from the streams was received. The mixed data may be sorted and re-written based on data stream, allowing for more efficient data access in the future. Blocks or valid data may be selected for garbage collection based on efficiency metrics associated with the data. Efficiency metrics may indicate an amount of potential improvement in data access efficiency that may be achieved from garbage collecting and rewriting the data. For example, host access patterns may be monitored to determine data that is frequently accessed closely together, so that the data may be rewritten in close physical proximity on the storage media for improved access efficiency. Data that is infrequently accessed may be moved to selected blocks or Flash die that has substantial wear or low reliability, in order to reduce the need to perform future program and erase cycles on the selected location. Other considerations may also affect the selection of data for garbage collection.

The data selection process 410 may include determining a quantity of data to garbage collect, a number of blocks to garbage collect, or a combination thereof. For example, data selection 410 may include identifying N selected blocks for data collection, and determining an amount of valid data to be collected and rewritten from the N blocks. Rather than selecting N individual blocks, N garbage collection units (GCUs) may be selected, with each GCU being a set of blocks that the DSD garbage collects together. Optionally, an average amount of valid data in each of the N blocks may be determined. Based on the amount of valid data to be collected across the N blocks, the system may determine an amount of work required to perform garbage collection operations on the N blocks (e.g. an amount of time, processing resources, or both to read the valid data, perform any error correction on the read data, and rewrite the valid data to a new location).

The DSD may also determine an amount of work required for incoming or pending data access operations 402. For example, the DSD may determine an amount of data to be written for host write commands pending in a command queue. The amount of pending write commands may be used to determine whether to perform garbage collection at all, and may therefore be determined prior to data selection for garbage collection 410. For example, if there is more data waiting to be written then there is available space in free blocks, the DSD may determine that garbage collection should be performed to make additional space available. The amount of host data to write may also influence the number N of blocks to garbage collect.

Based on the determined amount of work required to perform the host writes and the determined amount of work required to perform garbage collection on the selected N blocks, the DSD may determine a throttling amount by which to reduce throughput on the host writes. The throttling of host operations may be performed at 412, by limiting a number of host operations executed over a time period. Host command throttling may be performed to distribute the DSDs operational capacity between host commands and garbage collection and reorganizing operations. Throttling may be used to ensure that enough free space has been made available to complete host writes. If proper throttling is not enforced, host commands may time out while last-minute garbage collection is performed.

It may also be desirable to limit the variability of host command throughput at the DSD; e.g. the difference in the amount of time it takes to return a response for each host command received. By determining an amount of work to garbage collect the selected N blocks, the DSD may determine a throttling amount 412 that limits the variability in host command throughput over a period of time, such as the time it takes to garbage collect the N blocks. A ratio of host work to garbage collection work may be determined for how to distribute the DSD's operational capacity, such that the host throughput does not vary substantially while the garbage collections are performed.

Accordingly, the throttling 412 may distribute operational capacity between the host operations 402 and garbage collection and reorganization 414. The garbage collection 414, as described, may include reading valid data from blocks selected for garbage collection, correcting errors on the read data, and optionally reorganizing the read data based on parameters such as data streams associated with the data, logical address proximity of the data, host access behaviors, or other information. The read and reorganized data may then be written to new locations, and the garbage collected blocks may be erased and made free for future writes. Features of the system 400 are described below in regards to FIGS. 5 through 7. The methods of FIGS. 5 through 7 may be performed at a data storage device (DSD) by a garbage collection module (GCM) as described herein.

Figure 5:
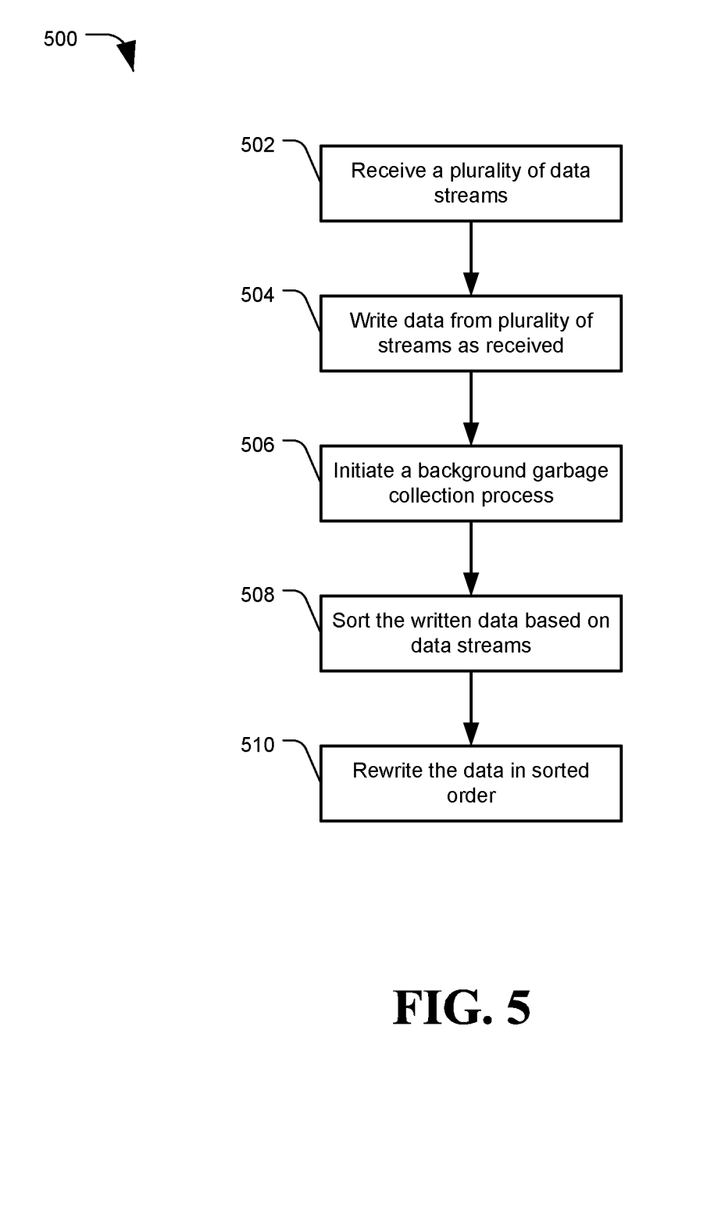
FIG. 5 is a flowchart of a method of enhanced garbage collection, in accordance with certain embodiments of the present disclosure.

FIG. 5 is a flowchart of an example method 500 of enhanced garbage collection operations, in accordance with certain embodiments of the present disclosure. Method 500 provides an example embodiment of a process for sorting data based on data streams to improve device performance.

Some solid state memory devices have a limited lifespan, often measured in a number of program-erase (PE) cycles that portions of the physical memory can undergo before the memory becomes unreliable at retaining data. Further, performing write operations on solid state memory may be relatively slow compared to performing read operations. Therefore it may be advantageous to reduce write amplification (WA) at solid state memories. WA can describe an undesirable phenomenon associated with solid-state drives (SSDs) where the actual amount of physical information written to nonvolatile memory is a multiple of the logical amount intended to be written. Operations such as wear leveling and garbage collection can involve moving and rewriting user data and metadata more than once, resulting in a higher WA, slowing drive performance and putting wear on the memory.

As discussed above, a data stream may include sequential data access commands from a single source, such as write commands from a single user or host. A DSD may be configured to receive multiple data streams concurrently. Receiving write operations via multiple data streams, without sorting the data, can result in writes to the SSD that appear to be random writes of unassociated data. This randomness can result in large WA, such as WA of approximately 6 (writing six times the logical amount of data received with the write commands) at typical overprovisioning levels. Overprovisioning may refer to the amount of additional storage at a DSD over what is reported to a host, to account for space occupied by invalid data, extra blocks to allow for garbage collection operations, defective storage locations, and other factors. Such a high WA value may be undesirable for expected drive life and throughput.

Sorting data for storage based on the data stream via which the data was received can improve access efficiency and reduce WA at the device. Sorting incoming requests may be accomplished via hardware solutions such as buffering the commands in a separate memory, and then storing data to the main nonvolatile memory in large sorted groups. However, SSD systems may have limited buffering available to sort incoming requests effectively due to non-volatility requirements of acknowledged writes and small amounts of hold up energy available. Hold up energy may refer to power from capacitors which can provide enough energy to save important metadata and acknowledged, but not yet programed, writes when power from a host is lost. To support multiple stream segregation such as that described by the T10 SAS (serial attached SCSI) protocol specification may require buffer space in addition to the command buffer 212 and command queue 213 depicted in FIG. 2, to temporarily hold the data stream, as well as extra outercode accumulator capability (e.g. an XOR accumulator buffer for each stream). These hardware-based solutions can add cost and complexity to the DSD.

Alternately, stream segregation and sorting may be performed via the method 500, without the cost and complexity of adding additional hardware. Method 500 may be performed at a DSD having limited buffer capacity for incoming commands and without buffers for sorting received data or having sufficient hold-up energy to ensure buffered data is stored to a non-volatile memory in case of power loss. Method 500 may include receiving a plurality of data streams, at 502. Commands from the plurality of data streams may be received simultaneously, or received one at a time in an interleaved or random distribution. Each command may include a metadata "tag" or some other stream attribute identifying a data stream via which the command was received. A stream identifier or tag may be assigned by a host issuing the command, by the DSD upon receiving the command, or by other means. The SAS protocol allows for hosts to flag streams or commands, as an example. In some implementations, a host may append a tag comprising a unique identifier (UID) of the host along with an identifier for a processing thread or command queue via which the command is delivered to the DSD. The tag may allow the DSD to distinguish data streams from different hosts, as well as different data streams from a single host.

The method 500 may include writing the data from the plurality of streams as the data is received, at 504. Write commands may be buffered at a host interface command queue pending execution, and then data associated with the commands may be written to free blocks of non-volatile solid state memory as if the data was random data, unsorted based on streams. There may be no hardware buffering or XOR striping to support the multiple streams as they enter the system. The DSD may update logical-to-physical address maps or tables to track where data is stored. The stream attribute or tag for each segment of data may also be stored to the address table.

After the data has been written once (WA=1), the method 500 may include initiating a background garbage collection process, at 506. The background process may be initiated when the DSD is in an idle state, such as when no host commands are being processed, or when the DSD has additional operational capacity above that required to service host commands. The background process may be initiated based on other triggers, such as when a selected number of blocks have been filled with new unsorted data, when a number of free blocks falls below a threshold, or based on other factors.

The background garbage collection process may include sorting and collating the data so that data is sorted according to the stream via which is was received. For example, data from stream 1 may be grouped together, data from stream 2 may be grouped together, and so on. The background collection process may including looking at the stream attribute stored in the logical to physical map in order to segregate data according to the streams. Alternatively, if the streams are not flagged but involve data having sequential logical block addresses (LBAs), the process can sort the data by LBA such that it is sequentially written and may be efficiently overwritten in entirety the next time a host writes that LBA range.

Once sorted, the data may be rewritten to the nonvolatile memory in sorted order, at 510. The sorting and rewriting process may add up to an extra integer value to the WA. For example the lowest WA achievable with a full hardware supported segregation scheme may be approximately 1 (varying somewhat based on data compression, associated metadata and error correction data, etc.). The lowest WA with the method 500, which doesn't require hardware support, may be approximately 2. The lowest WA with no segregation may be approximately 6. The method 500 provides most of the gain of hardware-based stream segregation without the added cost and complexity.

The data from each stream may be copied to its own block; e.g. data from stream 1 is stored to Block 1; data from stream 2 is stored to Block 2, etc. Alternately, the sorted data may be used to fill one block at a time; e.g. data from stream 1 is written to Block 1 until all stream 1 data is written, then data from stream 2 is written to Block 1 after the stream 1 data, etc. The sorting and rewriting process may include identifying and copying data for one stream at a time. For example, the data for stream 1 may be read, error correction code (ECC) and outercode data may be appended (e.g. via an XOR accumulator in high speed memory), and the stream 1 data may be written to a first block. Then the data from stream 2 may be read and copied to a second block, and so on, until all data has been sorted and copied. Alternately, all data may be read and sorted at once, and written one at a time. Numerous specific implementations are possible.

The DSD may logically designate certain blocks for storing the "jumbled" data before sorting, and other blocks that receive writes after sorting. Assume a sorted block A contains LBAs 1-100. If, after receiving a new set of unsorted writes, commands to update LBAs 1-100 were received, Block A may be erased and overwritten with the updated data, saving copying overhead. Even if not all pages of a block are updated together, keeping blocks sorted by LBA range or stream may still reduce processing overhead. Which blocks are used to store unsorted incoming data and sorted data may change over time due to garbage collection and wear leveling operations swapping different blocks into a free block queue.

Figure 6:
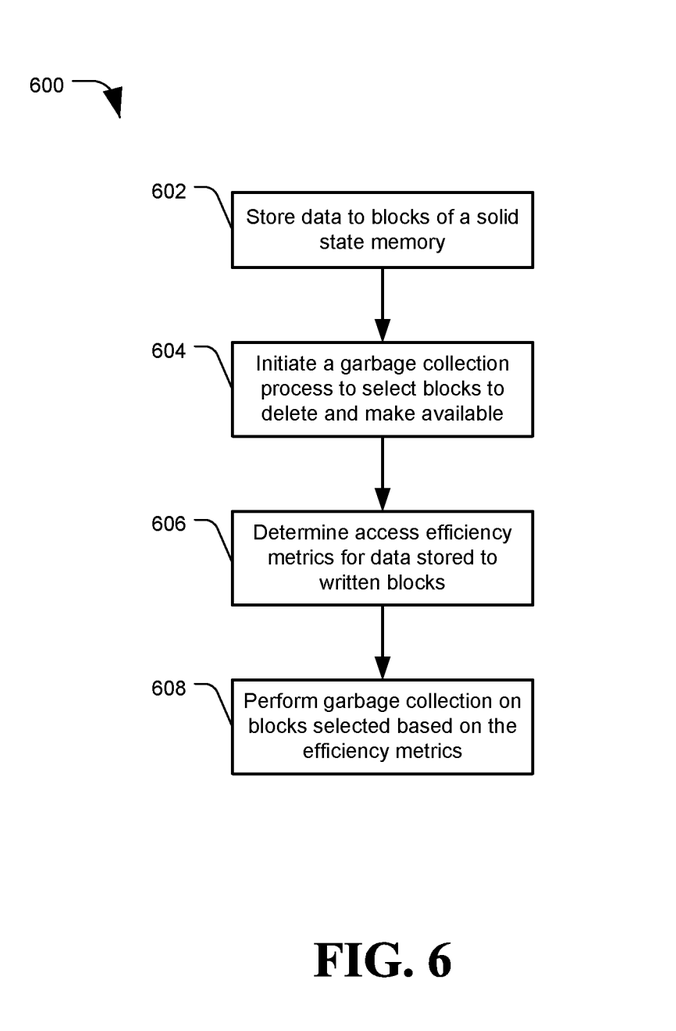
FIG. 6 is a flowchart of a method of enhanced garbage collection, in accordance with certain embodiments of the present disclosure.

Data may be sorted and garbage collected based on factors besides data streams, as described in regard to FIG. 6. FIG. 6 is a flowchart of an example method 600 of enhanced garbage collection operations, in accordance with certain embodiments of the present disclosure. In particular, method 600 provides an example embodiment of a process for selecting data for garbage collection based on host access attributes and access efficiency metrics.

Method 600 may include storing data to blocks of a solid state memory, at 602. In response to a trigger event (e.g. falling below a threshold amount of free blocks or during an idle period), the method 600 may include initiating garbage collection process, at 604. The garbage collection process may include selecting one or more blocks from which to copy valid data so that the block may be erased and made available for writing. A plurality of blocks, potentially across multiple dies, may be grouped together to specify a garbage collection unit (GCU), which will be processed during a garbage collection operation. A DSD may identify a selected number of blocks for garbage collection, with the blocks grouped into a GCUs prior to erasure or after they have been erased (thus providing a "free" GCU to receive new writes). For example, the blocks that constitute a GCU may be chosen prior to the GCU being written with host data. When data is to be written to a new block, a collection of free blocks including the new block may be logically grouped together into a GCU. Once full, the GCU and its constituent blocks may be garbage collected at the same time. After garbage collection is done, the blocks of the GCU can be changed or substituted. This could happen before or after the erase, but all of the valid data should be moved first during the garbage collection. In some implementations, multiple GCUs may be evaluated or processed for garbage collection together.

Blocks of a garbage collection unit may be selected based on which blocks include the least amount of valid data (e.g. which blocks are the most "stale", or have the most invalid data). Garbage collecting blocks based on staleness alone may free up the most amount of space, but may not improve data organization or fragmentation.

Accordingly, in order to select which blocks to garbage collect, the method 600 may include determining access efficiency metrics for data stored to blocks of the DSD, or of the blocks themselves, at 606. Access efficiency metrics may indicate an amount of potential improvement of data access efficiency at the DSD due to garbage collecting the data. Efficiency metrics may be determined for data based on information about the data itself (e.g. whether the LBAs of the data are sequential with LBAs of data in other blocks, which could be garbage collected together and re-written in sequential order), based on observed access patterns (e.g. how frequently data is read or updated, or whether particular data is frequently accessed closely in time to other data). Efficiency metrics for blocks may be based on a sum, average, or other mathematical calculation of the efficiency metrics of the individual valid LBAs or data within the block. Statistical information on accesses to data within a particular block or collection of blocks (e.g. a GCU) can be maintained and used to calculate access efficiency metrics. For example, a DSD may track a frequency of writes to various LBA ranges (e.g. the first 10% of the LBA range receives 90% of the writes, the next 20% of the LBA range receives 3% of the writes, etc.). As another example, a DSD may maintain a histogram of accesses to LBAs contained in a GCU. Efficiency metrics for blocks may also be based on characteristics of the block itself, such as how many program & erase cycles the block has undergone, or whether the block is exhibiting high wear or frequent errors. Data and statistics may also be maintained according to data streams, rather than or in addition to data maintained for particular blocks, GCUs, or data segments. Factors such as the staleness of a block may still be considered and factored into the efficiency metrics. Information used to determine access efficiency metrics, such as statistical access patterns, may be stored to addressing tables, or in separate data structures and accessible by the GCM. The different factors and access efficiency metrics may be weighted in any number of ways when selecting blocks for garbage collection, depending on performance goals.

In an example embodiment, a garbage collection module (GCM) may evaluate blocks having a staleness ratio above a selected threshold to determine access efficiency metrics. For example, the GCM may evaluate blocks with a staleness ratio of 50% or more (e.g., at least half of the pages of the block contain invalid data). The GCM may analyze the valid LBAs of the selected blocks to determine a longest sequence of consecutive or near-consecutive LBAs (e.g. having gaps in an LBA range of 10 LBAs or fewer) stored to different blocks. Consecutive or near-consecutive LBAs could be sorted and stored sequentially during a garbage collection operation. LBAs from a sequence of LBAs may be assigned access efficiency metric values based on the length of the sequence, for example, so that each LBA from a short sequence may be assigned a low metric of, e.g. 2, while each LBA from a long sequence may be assigned a higher metric of, e.g. 8. The determination of whether LBAs are in a sequence may be based on an evaluation of an address table to determine which LBAs are stored to each of the selected blocks.

The GCM may also evaluate host access patterns in determining efficiency metrics. For example, the DSD may monitor access patterns for LBAs, blocks, or data streams for various purposes, such as determining which data to pre-fetch to a cache. The access patterns may indicate whether a particular LBA is likely to be read or written within a certain number of operations or period of time from an input/output (I/O) operation to another LBA. The GCM may determine a likelihood of whether any of the LBAs from the selected blocks will be written soon (e.g. within a threshold period of time or number of operations). A write of such data shortly after performing a garbage collection would invalidate the data which was just copied, and would therefore be a wasteful operation. Accordingly, LBAs which are expected to be written soon may be assigned a low or negative access efficiency metric. By selecting blocks for garbage collection based on host access patterns, the garbage collection behavior at the DSD may change over time in response to changes in host access patterns.

Access patterns may also show that the data associated with a particular data stream are very likely to be written or updated in sequence. The GCM may determine whether data associated with the particular stream is spread across multiple blocks, and may select those blocks for garbage collection to consolidate the data associated with the particular stream. Access pattern analysis may also indicate how frequently certain data is updated. The GCM may collect and combine data with similar update patterns or frequency and store them together, so that frequently updated data is combined together and infrequently updated data is stored separately. For example, infrequently updated data may be combined and stored to blocks having higher wear or lower reliability, while frequently updated data may be combined and stored to blocks with less wear or greater reliability. Other embodiments are also possible.

Similar to evaluating statistics and characteristics of stored data, the GCM may also evaluate blocks themselves. For example, blocks that have less wear (e.g. fewer P/E cycles performed) may result in a higher access efficiency metric than a block that is more worn. Similarly, observed error rates or similar statistics for blocks may be considered.

Blocks or GCUs may be selected for garbage collection based on the access efficiency metrics for data stored to those blocks or GCUs, metrics for the blocks or GCUs themselves, or a combination thereof. For example, an access efficiency value or score for a block may be based on the access efficiency metrics of the valid data within the block (e.g. whether the data can be sequentially written with data from other blocks) combined with the access efficiency metric for the block itself (e.g. based on wear).

As described above, the access efficiency metrics may be based on a combination of analyzed blocks or GCUs. For example, when searching for sequential data, one GCU may have higher efficiency metrics when considered alongside other GCUs that contain data which can all be organized sequentially. Evaluating those same GCUs in isolation, however, may not indicate that they are strong candidates for garbage collection. Accordingly, the GCM may assign an access efficiency score to combinations of candidate blocks or GCUs based on their combined or averaged access efficiency metrics, to determine which set of blocks or GCUs would be the best combination to garbage collect (e.g. having a highest access efficiency score). For example, blocks 1, 4, and 9 may have an access efficiency score of 10, while a combination of 1, 2, and 9 may have an access efficiency score of 13.

After evaluating the access efficiency metrics, the method 600 may include performing garbage collection on the blocks selected based on the efficiency metrics, at 608. The target blocks to which the garbage collected data may be stored can also be evaluated. For example, data selected because it is frequently updated may be stored to a block with low wear levels, while data that is infrequently updated may be stored to a block with higher wear. Intelligently selecting blocks and data for garbage collection can improve the quality of service provided by the DSD, with faster response times, more reliable data storage, and other improvements.

Figure 7:
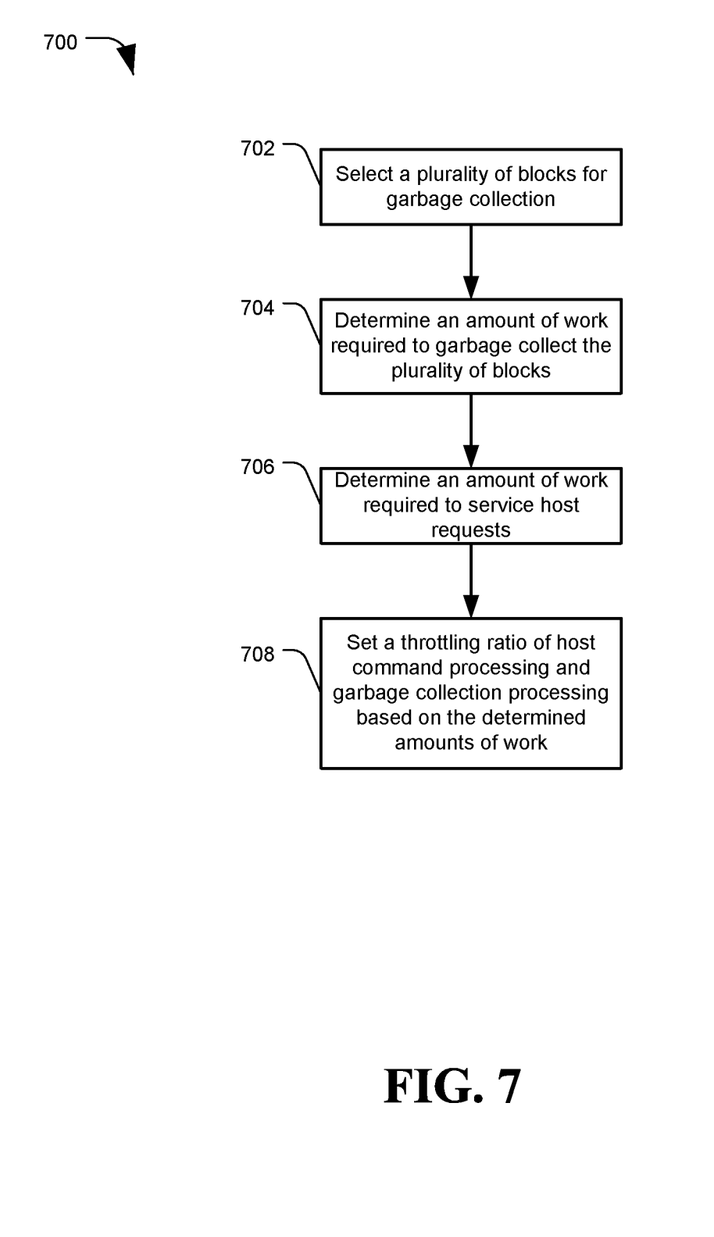
FIG. 7 is a flowchart of a method of enhanced garbage collection, in accordance with certain embodiments of the present disclosure.

Turning now to FIG. 7, a flowchart of an example method 700 of enhanced garbage collection operations is shown, in accordance with certain embodiments of the present disclosure. Method 700 provides an example embodiment of a process for smoothing host write throughput based on the staleness of a preselected set of blocks.

As previously discussed, a DSD may throttle host command throughput by limiting a number of host commands or an amount of host data that are processed over a period of time. Throttling may be performed to provide the DSD enough time to perform garbage collection or sorting operations without causing host commands to time out. For example, a DSD may throttle the host traffic and the garbage collection traffic at the speeds required to maintain a balance and keep enough available blocks erased and ready to program.

One way to determine how much to throttle host commands may be by selecting a next block or GCU to garbage collect and determining an amount of valid data that will be read and moved as part of the garbage collection process. The host operations may then be throttled enough to allow the determined amount of valid data to be garbage collected. However, throttling based on a single block or GCU at a time can produce irregular or inconsistent throttling, based on a varying amount of valid data in the different blocks or GCUs. This problem can be exacerbated when blocks or GCUs are selected for garbage collection not just based on which has the most invalid data, but by other considerations as described herein.

Beyond simply throttling to prevent host command timeouts, it may be beneficial to have the time it takes to execute and return a response to the host to be consistent across commands, rather than erratic due to varying amounts of work necessary to garbage collect different blocks or GCUs. Accordingly, the method 700 may be performed to achieve consistent throttling of host commands, and to minimize variability in command throughput.

Method 700 may include selecting a plurality of blocks for garbage collection, at 702. Sets of grouped blocks in the form of GCUs may also be selected, instead of individual blocks. The blocks or GCUs may be selected as described herein, based on data streams, sequential data, host access patterns, other factors, or any combination thereof. The number of blocks selected, represented as an integer "N", may be a preset amount; e.g. 10 blocks are selected whenever garbage collection is initiated. Alternately, the number of blocks may be variable; e.g. the number N may be inversely proportional to the amount of free blocks left, so that fewer free blocks results in a larger number N of blocks selected for garbage collection. Different amounts of blocks or GCUs may correspond to different threshold numbers of remaining free blocks. If garbage collection is initiated when a drive is idle or a host workload is low but the number of free blocks is not low, the number N may be small. Alternately, if garbage collection is initiated because of high host workloads and the number of free blocks is running low, a high number N may be selected.

The method 700 may include determining an amount of work required to garbage collect the valid data from the selected blocks, at 704. As an example, a drive may have a smallest fundamental mapping unit of 4 KB of data, and there may be an amount of "work" associated with each mapping unit, such as processing time, storage medium programming time, or other overhead. The GCM may determine a number of mapping units or other work metric required to garbage collect the valid data from the selected blocks. The GCM may average the amount of work to garbage collect each block, total the amount of work, or otherwise derive a work value to apply in determining a throttling amount.

At 706, the method 700 may include determining an amount of work required to service host requests or commands. The work associated with the host commands may be evaluated in the same manner as the garbage collection operations. For example, the GCM may determine a number of mapping units that must be written as part of a write command. Other work metrics may also be used, such as a number of free blocks or GCUs required to service the pending host operations. The GCM may evaluate work associated with host commands pending in a command queue for execution, for each command as it is received, or otherwise evaluate host requests.

Based on the determined amount of work to garbage collect the selected blocks, and the amount of work to service the host commands, the method 700 may include setting a throttling ratio of host command processing and garbage collection processing, at 708. The throttling ratio may be set so that host work and garbage collection work are alternated, with a first amount of host work performed for every second amount of garbage collection work performed. The work increments may be repeated in consistent increments until the garbage collection operation is completed. For example, the GCM may select four blocks for garbage collection Block 1 may require 120 mapping units to garbage collect, block 2 may require 280 units, block 3 may require 386 units, and block 4 may require 214 units, totaling 1000 mapping units of work for the selected blocks. The GCM may then determine that there are 800 mapping units of host data to write. The GCM could set the throttling ratio so that 125 mapping units of garbage collection is performed between every 100 mapping units of host data written, providing consistent throttling to the host operations while the four blocks are garbage collected, even though each of the four blocks required different amounts of work to collect. The GCM could partially garbage collect the selected blocks as necessary between executing host operations. For example, the DSD can interweave host writes and garbage collection writes at a map unit basis, and garbage collection reads may be interweaved at flash page basis. All three operations may therefore be effectively working at the same time.

By reducing the throughput of operations received from the host by a throttling amount set based on the determined amounts of work, the variability in the throughput can be limited over a set time period. For example, the time period may be the time required to perform the total work associated with both the host commands and the garbage collection operations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a processor configured to:
   receive a plurality of data streams, each data stream including write commands for sequential data from a single source;
   write data according to the plurality of data streams to solid state memory as individual write commands are received, with data written in an order individual write commands from the plurality of data streams were received, resulting in data from the plurality of data streams being intermixed in the solid state memory;

perform a background process to reorganize written data from an intermixed state to a state where data is sorted according to an associated data stream for each written data item, including:

determine associated data streams from the plurality of data streams for written data;

determine access efficiency metrics for reorganizing the written data, the access efficiency metrics indicating an amount of potential improvement of data access efficiency due to reorganizing the written data; and copy and rewrite the written data to be organized based on determined associated data streams and the access efficiency metrics of the written data, with data from a given data stream stored sequentially without data from other data streams intermixed with the data from the given data stream.

2. The apparatus of claim 1 further comprising:

the processor configured to write the data to blocks of a solid state memory;

the background process includes a garbage collection operation to copy valid data from a selected block and erase the selected block, the background process further including:

determine the access efficiency metrics for data stored to the blocks, the access efficiency metrics indicating an amount of potential improvement of data access efficiency due to garbage collecting data from the blocks; and perform the garbage collection operation on one or more blocks selected based on the efficiency metrics.

3. The apparatus of claim 2 comprising the processor further configured to:

select a plurality of blocks on which to perform the garbage collection operation;

determine an amount of work required to perform the garbage collection operation on all of the plurality of blocks; and reduce a throughput of operations received from a host by a throttling amount that is based on the determined amount of work, in order to limit variability in the throughput over a time period.

4. The apparatus of claim 1 comprising the processor further configured to:

write the data from the plurality of data streams to the same storage block as the individual write commands are received; and perform the background process to organize and rewrite the written data into a different storage block for each data stream.

5. The apparatus of claim 1 comprising the processor further configured to:

store a stream identifier tag to an address table for each segment of the written data, the stream identifier tag indicated which data stream from the plurality of data streams is associated with each segment of data; and access the address table for the written data to organize the written data according to the associated data streams based on the stream identifier tags.

6. The apparatus of claim 5 further comprising:

data streams from the plurality of data streams are flagged with the stream identifier tags by a host issuing the data streams; and data of the plurality of data streams is written and then organized and rewritten with a write amplification value of approximately 2, write amplification representing an amount of data actually written to nonvolatile solid state memory as a multiple of a logical amount of data intended to be written by a write operation.

7. The apparatus of claim 1 further comprising:

data streams from the plurality of data streams are characterized by write commands for data having sequential logical block addresses (LBAs); and the processor further configured to determine the associated data streams based on identifying data having sequential LBAs.

8. An apparatus comprising:

a processor configured to:

receive a plurality of data streams, each data stream including write commands for sequential data from a single source;

write data to blocks of a solid state memory, with data from the plurality of data streams being intermixed in the solid state memory;

perform a garbage collection operation to copy valid data from a selected block and erase the selected block, the garbage collection operation including:

determine an associated data stream from the plurality of data streams for segments of written data;

determine access efficiency metrics for data stored to the blocks based on a relation of data in the blocks to other stored data, the access efficiency metrics indicating an amount of potential improvement of data access efficiency due to garbage collecting data from the blocks and rewriting the data from an intermixed state to a state where data is sorted according to an associated data stream; and perform the garbage collection operation on one or more blocks selected based on the determined access efficiency metrics.

9. The apparatus of claim 8 comprising the processor further configured to:

write the data from the plurality of data streams to the solid state memory as the write commands of the plurality of data streams are received; and perform a background process including the garbage collection operation.

10. The apparatus of claim 8 comprising the processor further configured to:

select a plurality of blocks on which to perform the garbage collection operations;

determine an amount of work required to perform the garbage collection operation on all of the plurality of blocks; and reduce a throughput of operations received from a host by a throttling amount that is based on the determined amount of work, in order to limit variability in the throughput over a time period.

11. The apparatus of claim 8 comprising the processor further configured to determine the access efficiency metrics for data stored to blocks having above a selected threshold ratio of invalid data to valid data.

12. The apparatus of claim 8 comprising the processor further configured to:
- group candidate blocks for garbage collection into sets of different combinations of blocks for purposes of access efficiency evaluation, with a given block included in multiple sets;
- determine the access efficiency metrics for the given block based on the other blocks in a currently evaluated set, the given block having different access efficiency metrics in different sets;
- assign an access efficiency score to each set based on the access efficiency metrics for the blocks within that set; and
- garbage collect blocks from a set having the highest access efficiency score.

13. The apparatus of claim 8 comprising the processor further configured to:
- determine the access efficiency metrics based on a likelihood that the data will be accessed within a threshold period, wherein the access efficiency metrics indicate the amount of potential improvement of data access efficiency is increased by storing data accessed in temporal proximity to storage locations in close physical proximity.

14. The apparatus of claim 8 comprising the processor further configured to:
- determine the access efficiency metrics based on whether the data is sequentially addressed with other data in other blocks evaluated for garbage collection.

15. An apparatus comprising:
a processor configured to:
- receive a plurality of data streams, each data stream including write commands for sequential data from a single source;
- write the data from the plurality of data streams to blocks of a solid state memory such that data from different streams are stored in an intermixed state;
- perform a garbage collection operation to copy valid data from a plurality of blocks, the garbage collection operation including:
  - determine an associated data stream from the plurality of data streams for segments of written data;
  - determine access efficiency metrics for data stored to the blocks based on a relation of data in the blocks to other stored data, the access efficiency metrics indicating an amount of potential improvement of data access efficiency due to garbage collecting data from the blocks and rewriting the data from an intermixed state to a state where data is sorted according to an associated data stream; and
  - perform the garbage collection operation on the plurality of blocks selected based on the determined access efficiency metrics.

16. The apparatus of claim 15, further comprising:
the processor further configured to:
- perform the garbage collection operation, further including:
  - select the plurality of blocks on which to perform the garbage collection operation;
  - determine a first amount of work required to perform the garbage collection operation on all of the plurality of blocks; and
  - reduce a throughput of operations received from a host by a throttling amount that is based on the determined first amount of work, in order to limit variability in the throughput over a time period.

17. The apparatus of claim 16 comprising the processor further configured to:
- determine a second amount of work required to service the operations received from the host;
- determine a ratio of host work and garbage collection work to perform based on the first amount of work and the second amount of work; and
- reduce the throughput of operations received from the host based on the ratio.

18. The apparatus of claim 16 comprising the processor further configured to:
- determine the first amount of work based on a number of fundamental mapping units of valid data to be read and rewritten during the garbage collection operation.

19. The apparatus of claim 16 further comprising:
- the variability in the throughput is a difference in an amount of time to return a response for each operation from the host; and
- the processor further configured to reduce the throughput of operations received from the host by alternating a first amount of host work performed with a second amount of garbage collection work performed, the first amount and the second amount repeated in consistent increments until the garbage collection operation is completed for the plurality of blocks.

20. The apparatus of claim 15 comprising the processor further configured to:
- write the data from the plurality of data streams to the solid state memory as the write commands of the plurality of data streams are received; and
- perform a background process including the garbage collection operation, the background process including:
  - copy and rewrite the written data to be organized based on the associated data stream.

* * * * *